United States Patent
Stever et al.

(10) Patent No.: US 11,878,913 B1
(45) Date of Patent: Jan. 23, 2024

(54) METHODS AND SYSTEMS FOR MAKING AND USING REFINED LIME FLOUR

(71) Applicant: Mississippi Lime Company, St. Louis, MO (US)

(72) Inventors: Michael S. Stever, Arnold, MO (US); Martin Gran, Chesterfield, MO (US); Randy Griffard, St. Mary, MO (US); Gerald Kevin Bequette, Ste. Genevieve, MO (US); Nathan T. Hooper, Farmington, MO (US)

(73) Assignee: Mississippi Lime Company, St. Louis, MO (US)

( * ) Notice: Subject to any disclaimer, the term of this patent is extended or adjusted under 35 U.S.C. 154(b) by 88 days.

(21) Appl. No.: 17/504,060

(22) Filed: Oct. 18, 2021

Related U.S. Application Data

(60) Provisional application No. 63/092,654, filed on Oct. 16, 2020.

(51) Int. Cl.
 *C01F 11/02* (2006.01)

(52) U.S. Cl.
 CPC .......... *C01F 11/02* (2013.01); *C01P 2004/51* (2013.01)

(58) Field of Classification Search
 CPC .............................. C01F 11/02; C01P 2004/51
 See application file for complete search history.

(56) References Cited

U.S. PATENT DOCUMENTS

| | | |
|---|---|---|
| 6,200,543 B1 | 3/2001 | Allebach et al. |
| 8,133,401 B2 | 3/2012 | Christy et al. |
| 9,650,293 B2 | 5/2017 | Christy et al. |
| 9,856,166 B2 | 1/2018 | Christy et al. |
| 10,307,728 B1 | 6/2019 | Griffard et al. |
| 11,365,150 B1 | 6/2022 | Griffard et al. |
| 11,603,318 B1 * | 3/2023 | Gran ........................ C02F 1/00 |

OTHER PUBLICATIONS

Brunauer et al., "Adsorption of Gases in Multimolecular Layers," Journal of the American Chemical Society, Feb. 1938, vol. 60, No. 2, pp. 309-319.

Hassibi, Mohamad, "Effect of Slaking Water Temperature on Quality of Lime Slurry," Chemco Systems, L.P., Jul. 2009, 8 pages.

Stoiber, Roman, "Slakers and Movers," STT Enviro Corp Systems & Solutions, Canada, Jul. 8, 2015, retrieved from the Internet on Aug. 18, 2023. Retrieved from the Internet <URL:https://www.cemnet.com/Articles/story/157192/slakers-and-movers.html>, 1 page.

* cited by examiner

*Primary Examiner* — Timothy C Vanoy
(74) *Attorney, Agent, or Firm* — Lewis Rice LLC

(57) ABSTRACT

A system and method of removing grit and contaminants from a lime oxide flour where the lime oxide flour begins as a standard lime flour which has a particle-size distribution of greater than 90% minus 100 mesh and less than 80% minus 200 mesh. The standard lime flour is then refined via classification to a refined lime flour which has greater than 80% minus 200 mesh. The refined lime flour may then be used for formation of lime hydrate at end-user on site production where it is typically less reactive to slaking water temperature variations.

1 Claim, 5 Drawing Sheets

METHODS AND SYSTEMS FOR MAKING AND USING REFINED LIME FLOUR

CROSS REFERENCE TO RELATED APPLICATIONS

This application claims benefit of U.S. Provisional Patent Application No. 63/092,654, filed Oct. 16, 2020, the entire disclosure of which is herein incorporated by reference.

BACKGROUND OF THE INVENTION

Field of the Invention

This disclosure relates to the field of producing calcium oxide (CaO). More specifically, this disclosure relates to producing enhanced calcium oxide in the form of a refined lime flour, which refined lime flour may be used to produce a lime hydrate slurry, also known as a calcium hydroxide slurry.

Description of the Related Art

Calcium oxide (CaO), which is commonly referred to as quicklime (or even just lime), is an incredibly useful compound with a storied history in a variety of industrial applications in all sorts of areas. Exemplary uses for calcium oxide range from many years ago where calcium oxide was heated to produce stage lighting (where the term "lime light" comes from) and as a building mortar for stone structures, to more modern uses where calcium oxide is an essential component of building materials such as cement, concrete, and plaster.

Overall, calcium oxide is a useful chemical with many industrial applications. This may be because calcium oxide is typically reactive with many different chemicals and typically forms a base in water. As a result, there are many industrial and other applications for calcium oxide. For example, some applications take advantage of calcium oxide's alkaline or basic properties. In some uses, calcium oxide may be introduced into water to maintain a basic pH of the water. In other uses, the calcium oxide may be used to react with other chemicals. For example, calcium oxide may be used to treat wastewater at water treatment facilities. In particular, calcium oxide in water (typically in the form of calcium hydroxide) may be used to soften the water or to remove contaminants or other unwanted ions from the water. In some applications, the calcium oxide may react with the contaminants or other unwanted ions, allowing them to fall out of solution as a solid particulate. Calcium oxide also has a particularly useful application in heavy industries where industrial processes create unwanted flue gas.

Calcium oxide may also be used to produce calcium hydroxide, which is another useful compound. For example, calcium hydroxide ($Ca(OH)_2$) may be used industrially as a flocculant in various processes including water and sewage treatment. Other uses for calcium hydroxide include the production of ammonia gas, the production of sodium hydroxide, and the scrubbing of acid gases from industrial exhaust gas streams. An example of the latter is the use of calcium hydroxide to react with sulfur/oxygen compounds ($SO_x$) often present in exhaust gas streams to produce, for example, calcium sulfate and water. Such a process is disclosed in U.S. patent application Ser. No. 16/511,168, the entire disclosure of which is incorporated herein by reference.

As discussed in the above patent application, calcium hydroxide particulate compounds have traditionally been manufactured according to commonly known and utilized processes. For example, a lime feed (e.g., limestone, which contains calcium carbonate) may first be heated in a lime kiln to a temperature above about 825° C. where calcium oxide is formed in accordance with the following formula:

$$CaCO_3(s) \rightarrow CaO(s) + CO_2(g)$$

The calcium oxide is then continuously grinded using a pulverizing mill. Second, the calcium oxide meeting the desired size requirements is then fed into a hydrator, where the calcium oxide reacts with water (also known as slaking), and then quickly dried to form calcium hydroxide in accordance with the following equation:

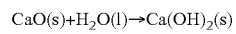

$$CaO(s) + H_2O(l) \rightarrow Ca(OH)_2(s)$$

Finally, the resultant calcium hydroxide may then be further processed as needed.

The reaction of a particulate calcium hydroxide composition with an acid gas (such as $SO_x$) is generally assumed to follow the diffusion mechanism. The acid gas removal is the diffusion of acid gas from the bulk gas to the sorbent particles. Thus, the total surface area of the composition (which is related to the mean particle size and particle size distribution within the composition) is believed to be very important for calcium hydroxide used in acid gas removal. Specifically, increased surface area implies faster reaction time and, thus, compositions with particles that are smaller than compositions with particles that are larger should be more reactive and better at acid gas mitigation (as well as faster and possibly more complete and more efficient reactions in other applications). However, in practice, while high surface area (as represented by smaller particle size) is important, a small particle size composition alone has proven to not warrant a prediction of improved removal of acid gases. Thus, the old wisdom on how to make calcium hydroxide more reactive (which is simply to grind it into smaller and smaller particles) may not really work.

Instead, surface area of a calcium hydroxide particulate composition has now turned to a more sophisticated calculation that takes into account the shape of the particles within the composition to better determine the composition's reactivity to acid gases when injected as a dry sorbent (or to other chemicals when used in different applications). This calculation is referred to as the "BET surface area" of the calcium hydroxide particulate composition. BET surface area is generally a determination of surface area based on the theories of Stephen Brunauer, Paul Hugh Emmett, and Edward Teller (commonly called BET theory and discussed in S. Brunauer, P. H. Emmett and E. Teller, *J. Am. Chem. Soc.*, 1938, 60, 309, the entire disclosure of which is herein incorporated by reference). This methodology particularly focuses on the available surface area of a solid for absorbing gases—recognizing that surface area, in such circumstances, can be increased by the presence of pores and related structures. BET surface area, therefore, takes into account that the total surface area of a spray of particles is not only dependent on the size of the particles, but is dependent on their "shape," in that particles with lots of holes (pores) can have a greater surface area than their size would imply.

However, there are further practical concerns when considering how effective calcium oxide is for a given application, such as, for example, when considering how to best reduce the presence of acid gas within flue gas streams. Many acid gas mitigation processes rely on the injection of a calcium hydroxide slurry into the flue gas stream, which slurry is typically a mixture of water and calcium hydroxide. Many other applications also rely upon calcium oxide in the form of calcium hydroxide. For many calcium oxide end users, the calcium hydroxide slurry used for their applications is manufactured by the end user from raw ingredients (such as water and calcium oxide) at a position that is proximate to the end use. For example, water purification operators typically manufacture calcium hydroxide from calcium oxide, water, and potential additives in a place that is proximate to the water source to be treated. In many such processes, the end user acquires calcium oxide, hydrates the calcium oxide to form calcium hydroxide, and then adds excess water to the calcium hydroxide to form a slurry. This calcium hydroxide slurry's constitution, as well as how the slurry is made, may be a source of inefficiencies for many water purification processes.

One factor in the efficiency of the calcium hydroxide slurry during use is the relative level of grit found within the calcium hydroxide slurry. There are typically two sources of grit: (1) contaminants in the calcium carbonate feedstock and (2) the process of hydrating the calcium oxide to form calcium hydroxide. For the former, this grit is typically a collection of inert material that finds its way into the calcium hydroxide slurry because the calcium carbonate feedstock used to make the calcium oxide (which is then used to make calcium hydroxide) in the slurry contains a certain amount of material other than calcium carbonate. Typically, a calcium carbonate base material contains about 90%-95% calcium oxide, with the balance being grit. As a result, the related calcium oxide produced is typically more than about 92% pure calcium oxide.

For the latter source of grit, the process of making calcium hydroxide may require a relatively controlled environment to efficiently produce calcium hydroxide. When certain process variables are not within predetermined ranges, grit may be produced. For example, when the temperature of the process for making calcium hydroxide (such as slaking) is conducted outside of the optimum ranges, the process may create some portion of lesser-reactive or even unreactive agglomerates of calcium oxide and/or calcium hydroxide. Many of these agglomerates may be in the form of portlandite. The presence of these agglomerates may make the resultant calcium hydroxide product less-reactive, and may even increase the costs of using calcium oxide because more feedstock calcium oxide may be needed to accomplish the same goals when compared to a process that forms less agglomerates. There may also be a cost to any grit mitigation efforts undertaken by the end user.

Unfortunately, it may not be feasible for many calcium oxide end users to conform their slaking processes to industry standards or best practices. This may be the result of many variables, include the knowledge of the slaker, the sophistication of the slaking, and the slaking environment, along with many others known to persons of ordinary skill in the art. Accordingly, any calcium oxide end user, especially those that slake or otherwise react the calcium oxide, must balance the cost associated with using calcium oxide and its byproducts together to determine what most efficiently fits their needs.

Calcium hydroxide end users typically separate the grit from the calcium hydroxide slurry by using a grit screen or screw, which separates the grit from the calcium hydroxide in the slurry. The grit may then be disposed of by any means known to persons of ordinary skill in the art. Although typically effective at removing grit from a calcium hydroxide slurry, these additional processing steps often result in increased costs for the calcium hydroxide end user. In addition, increased grit formation indicates greater quantities of calcium oxide feedstock will be required to achieve the same percentage of calcium hydroxide solids in the resultant calcium hydroxide slurry. Again, this increased calcium oxide consumption may result in additional costs for the calcium hydroxide end user.

Moreover, there may be additional costs associated with the presence of grit in calcium oxide or calcium hydroxide. For example, the presence of grit in a calcium hydroxide slurry may cause the grit to build-up in downstream process chambers or vessels. Similarly, grit may plug or clog nozzles or any orifices through which the slurry containing the grit passes. The grit, due to its natural abrasiveness, may scratch or otherwise wear equipment when interacting with treatment equipment and calcium hydroxide slurry delivery equipment, which equipment may include, without limitation, pumps, pipes, valves, and similar equipment.

Further, as discussed briefly above, the presence of grit in calcium oxide may increase costs by complicating the process of slaking the calcium oxide to form calcium hydroxide for use in a related calcium hydroxide slurry. Typically, slaking calcium oxide at temperatures below about 180° C. to about 190° C. results in a calcium hydroxide slurry with larger, less reactive calcium hydroxide agglomerates and increased grit production. In order to maintain an optimal slaking temperature of above about 190° C., it may be required to adjust the water/calcium oxide ratio during the slaking process. Some slaking processes even use feed systems with a programmable logic controller ("PLC") having one or more feedback loops to ensure that the calcium oxide is being slaked in the correct temperature range. The costs here to the calcium hydroxide slurry end user are in the form of man-hours or expensive weigh cells/belts systems coupled with complicated motor controllers and specialized, integrated software.

The issue of slaking temperature control may be further exacerbated in winter months when calcium hydroxide end users tend to use colder feed water for calcium oxide slaking. Specifically, many end users do not utilize temperature control on their feed water and this results in the water used in winter having a lower temperature do to it traveling and being stored in a lower temperature environment. Costs may be compounded by a reduction in the efficacy of the resultant calcium hydroxide slurry when the slaking temperature is too low because the larger, less reactive calcium hydroxide agglomerates and increased grit production require more feedstock to be used and more end product to be used to mitigate flue gas acids. These issues (slaking, grit, and water temperature) are discussed in detail in the following patents, each of which is hereby incorporated by reference in its entirety: U.S. Pat. Nos. 9,856,166; 8,133, 401; and 9,650,293. Also the following industry publication is relevant and incorporated here in their entirety: "Slakers and Movers" STT Enviro Corp Systems & Solutions, Canada. Effect of Slaking Water Temperature on Quality of Lime Slurry, Mohamad Hassibi, Chemco Systems, L.P. July, 2009.

As a result of the above issues with slaking calcium oxide, some calcium hydroxide end users have begun to acquire a hydrated lime (calcium hydroxide) product, which hydrated lime has already been slaked under optimal conditions by a commercial lime supplier, in place of acquiring calcium oxide and slaking it themselves. In particular, it may be advantageous to use a highly reactive lime hydrate, which is discussed in, for example, U.S. Pat. No. 10,307,728, the entire disclosure of which is hereby incorporated by reference in its entirety. After acquiring a hydrate lime product, the calcium hydroxide may simply be mixed with water to produce a calcium hydroxide slurry having whatever percent calcium hydroxide solids preferred or required.

One advantage to the use of a hydrated lime product by the end user is that nearly all grit has previously been removed by the commercial calcium hydroxide supplier, which may eliminate end user costs associated with grit disposal. Further, the use of commercially prepared calcium hydroxide may reduce wear and tear on pumps, piping, and other elements of the end users' calcium hydroxide slurry distribution system. Moreover, using a calcium hydroxide eliminates cost associated with slaking, including the costs associated with controlling the slaking temperature, discussed above, at least because calcium hydroxide does not need to be slaked. Stated another way, because the calcium hydroxide has already been slaked by the commercial lime supplier, a calcium hydroxide end user need only mix the calcium hydroxide with water to the correct ratio to achieve the desired percentage of calcium hydroxide solids in the resulting calcium hydroxide slurry.

While the use of calcium hydroxide may solve many issues for end users wishing to use a calcium hydroxide slurry in their processes, the use of calcium hydroxide is not without its own potential drawbacks. One such drawback is due to the bulk density differences between calcium oxide and calcium hydroxide. The bulk density of calcium oxide typically ranges between about 55 lbs. per cubic foot to about 60 lbs. per cubic foot, while the bulk density of calcium hydroxide is typically closer to 30 lbs. per cubic foot. Thus, freight costs associated with the transportation of calcium hydroxide is typically higher than that of calcium oxide due to the decreased density. In addition, the onsite storage capacity of raw materials may be nearly halved when storing calcium hydroxide, as opposed to calcium oxide. Said differently, it may be less efficient to ship and store calcium hydroxide when compared to the shipping and storage of calcium oxide. Accordingly, there may be a need for a calcium oxide product that avoids the issues associated with the use of calcium hydroxide while also avoiding some of the issues discussed above with the presence of grit in calcium oxide and the formation of grit during the slaking process.

SUMMARY OF THE INVENTION

The following summary of the invention is provided to give the reader a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented in a later section.

Because of these and other problems in the art, described herein are systems and methods for the use of a Refined Lime Flour (RLF), and the RLF itself, in the production of calcium hydroxide particularly in on-site production facilities of an end user of calcium hydroxide. RLF typically comprises a Standard Lime Flour (or SLF) which has been further refined to produce a smaller particle and typically a narrower particle size distribution.

There is also described herein a system and method of removing grit and contaminants from a lime oxide flour where the lime oxide flour begins as a standard lime flour which has a particle-size distribution of greater than 90% minus 100 mesh and less than 80% minus 200 mesh. The standard lime flour is then refined via classification to a refined lime flour which has greater than 80% minus 200 mesh. The refined lime flour may then be used for formation of lime hydrate at end-user on site production where it is typically less reactive to slaking water temperature variations.

DETAILED DESCRIPTION OF PREFERRED EMBODIMENTS

Figure 1:
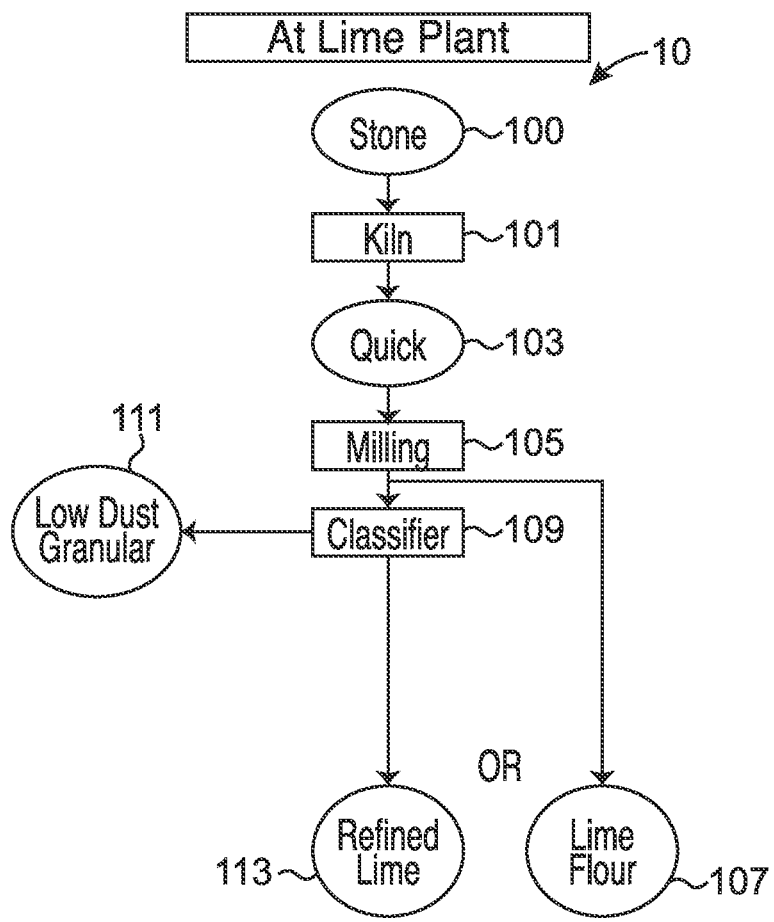
FIG. 1 depicts a high-level block diagram of a process for making either lime flour or refined lime flour in accordance with this application.

FIG. 1 depicts a high-level block diagram of a process (10) for producing calcium oxide in the form of either standard lime flour (107) or refined lime flour (113). The depicted process (10) begins with a calcium carbonate containing raw feed product (100), such as limestone. Although limestone may typically be used as an initial raw feed product (100), other calcium carbonate containing products may be used, alternatively or additionally, as would be understood by persons of ordinary skill in the art. In some embodiments, the raw feed product (100) will be processed in some manner, such as, for example, subjecting the raw feed product (100) to grinding or pulverizing. Subsequently, the calcium carbonate containing raw feed product (100) is fed into a lime kiln (101). Any lime kiln (101) capable of producing calcium oxide from calcium carbonate may be used, as would also be known to persons of ordinary skill in the art. While in the lime kiln (101), the calcium carbonate in the raw feed product (100) is oxidized into calcium oxide (103) while other materials, such as carbon dioxide, are simultaneously produced as waste products. Next, the resulting mixture of calcium oxide (103) and waste is cooled. Any cooling processes known to persons of ordinary skill in the art may be used so that the calcium oxide (103) may be subsequently processed.

Next, the calcium oxide (103) may be subjected to a conditioning process that will typically include a milling step (105) and may include an optional classification step (109). First, the calcium oxide may be milled (105) to a predetermined size. Any milling or grinding process known to persons of ordinary skill in the art may be used including, for example, fine grind cage milling, swing hammer milling, screen milling, etc., where the amount of milling produces the desired particle-size distribution. During a typical milling process (105), the calcium oxide (103) is continuously grinded using a pulverizing mill until a certain percentage of all the ground particles meet a desired size. This may be larger than that of lime flour, which is often a particularly fine product. This product may then be removed leaving lime flour as a smaller product.

Alternatively, the calcium oxide may be ground so the output of the milling process (105) is a particulate lime product of certain size which is a lime flour. In an embodiment, the lime flour will have a particle size with between 90% and 95% smaller than 100 mesh. A lime flour (107) or this size may be referred to herein as a standard lime flour or "SLF." This SLF product may then be used to make calcium hydroxide by any method known to persons of ordinary skill in the art, including, without limitation, slaking.

In an embodiment, the SLF (107) will be subsequently subjected to a classification process (109). During the classification process, grit and very small, dust-like particles of calcium oxide (111), which typically is waste, may be removed from the SLF (107). In addition, particles having too great of size may also be removed. The output of the classification process (109) is then the waste product (111) (which may still be used in separate processes and need not be disposed of, it is simply referred to as a waste as it is not used in the present systems and methods) and the separated narrower band product is referred to as refined lime flour (113) (RLF). Accordingly, the classification process (109) will tend to create refined lime flour (113) that has a relatively tight and uniform particle distribution compared to SLF. Any means known to persons of ordinary skill in the art may be used to perform the classification process (109).

The classification process (109) may include a mesh classification system, which system may generally comprise a mesh classifier, or an air classification system, which system may generally comprises an air classifier (e.g., a standard Raymond or Sturtevant air classifier) or a turbine classifier. Any process may be used for the classification process, however, that generally is capable of removing too small and too large particles from a milled batch of calcium oxide. Milling and classification processes are also discussed in U.S. Pat. Nos. 10,221,094 and 10,457,598, the disclosures of which are hereby incorporated by reference in their entirety.

Accordingly, RLF is a calcium oxide product that has been milled and classified to produce a fine calcium oxide product of relatively uniform size and composition compared to SLF. It should be recognized that RLF is typically not of uniform size, as that is often commercial impossible to produce. Instead, RLF is produced by refining the size of an SLF to have a smaller size, and may also include a narrower size band. As discussed above SLF, per the ASTM C110 procedure is formed by having a final lime size typically of between 90% and 95% less than 100 mesh. This will typically result in less than 80% passing 200 mesh. RLF will typically be milled per the ASTM C110 procedure and classified to produce material that was sized to greater than 80% passing 200 mesh.

RLF may offer advantages over SLF, such as, for example, forming a more uniformly reacting calcium product that produces a minimal amount of grit when slaked. The milling portion of the conditioning process may ensure that all calcium oxide particles are reduced to a nominal size, while the classification portion typically removes oversized and undersized particles, as well as impurities, from the RLF. Both conditioning steps are typically used to produce a final calcium oxide product that may be defined as RLF.

SLF, as used herein, is, thus, a calcium oxide product that has undergone the milling step to produce the necessary size reduction, but which product has not undergone the additional classification step. Stated another way, SLF includes a size reduction only, while RLF includes both a size reduction and a chemical quality improvement, which may include a more uniform particle size distribution and a reduction in impurities. These products and their different processes are depicted in FIG. 1.

As calcium oxide is generally not stable and, when cooled, will spontaneously react with carbon dioxide from the air until, after enough time, it is completely converted back to calcium carbonate, all the milling and classification of the calcium oxide should preferably be conducted entirely in a closed-circuit system to prevent air slaking and recarbonation (i.e., calcium oxide to calcium carbonate) from occurring, although a closed-circuit system is by no means required. In some embodiments, additional measures are employed to prevent recarbonation. For example, conditioned low carbon dioxide air can be injected into these systems to replace any air being drawn in and around process equipment bearings and seals. This conditioned air is also very useful if the calcium oxide needs to be pneumatically conveyed. Processes for conditioning this air are discussed more fully in U.S. Pat. No. 6,200,543, the entire disclosure of which is incorporated herein by reference.

Figure 5:
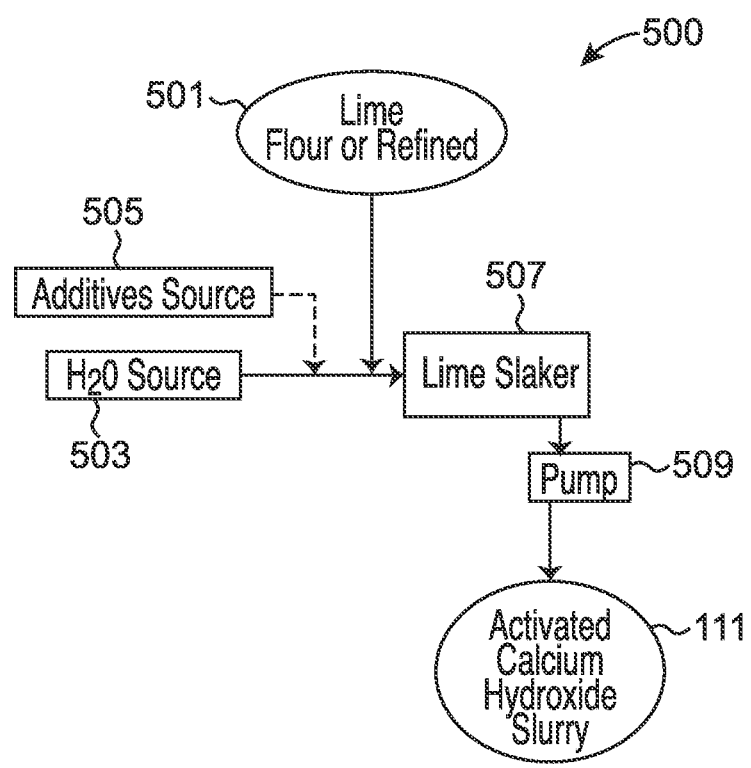
FIG. 5 depicts a high-level block diagram of a process for producing a calcium hydroxide slurry from a calcium oxide feedstock, which may be lime flour or refined lime flour.

A slaking process (500) in accordance with this application is depicted in a high-level block diagram shown in FIG. 5. In the depicted embodiment, the slaking process (500) may begin with the furnishing of either SLF or RLF (501). Next, the SLF or RLF (501) may be introduced to a water source (503). This introduction may occur in a lime slaker (507), or the introduction may occur before the materials are placed into the lime slaker (507). At or around the same time, additives (505) may also be introduced into the water source (503); the SLF or RLF (501); or into the lime slaker (507). Additives (505) may be added into the process (500) in order to adjust or modify the properties of the resulting calcium hydroxide slurry (511). These additives are generally known as accelerators or retarders, which, as their names suggest, accelerate or retard the reaction of calcium oxide to calcium hydroxide. These changes in the reaction may then affect the properties of the resulting calcium hydroxide.

In any case, the lime slaker (507) will mix the water (503) and the calcium oxide (501) to form calcium hydroxide. Eventually the slaked calcium oxide, which is now calcium hydroxide (511), will be removed from the lime slaker (507) by some means, such as a pump (509). The end product will be a calcium hydroxide slurry (511), which is typically calcium hydroxide mixed with excess water, as well as (hopefully small) amounts of impurities.

Now, a series of experimental examples of SLF (107) and RLF (113) being used to produce lime hydrate slurries will be discussed. In particular, two samples of SLF (107) and two samples of RLF (113) were slaked to produce calcium hydroxide to serve as a total of four comparative examples. In order to make the calcium oxide products to be tested, two half-inch calcium oxide samples from a lime kiln were each split in half Two of the four resultant halves were milled per the ASTM C110 procedure (which requires that the final lime size be near 6 mesh) to produce SLF. The other two halves of the half-inch calcium oxide samples were milled per the ASTM C110 procedure and classified to produce RLF that was sized to 80% passing 200 mesh. One sample of SLF and one sample of RLF were each slaked at the ASTM C110 standard slaking water temperature of 25° C. Similarly, one sample of SLF and one sample of RLF were slaked at 0° C. to mimic winter weather slaking water temperatures. A summary of this experimental matrix is provided in Table 1, below.

TABLE 1

|  | Lime Feed Type | Slaking Start Water Temp (° C.) |
| --- | --- | --- |
| Example A | SLF | 25 |
| Example B | RLF | 25 |
| Example C | SLF | 0 |
| Example D | RLF | 0 |

A number of properties of each slaked sample (Examples A, B, C, and D) were explored, and the results of these explorations will be discussed herein below. First, experimental results with respect to the calcium oxide slaking rate of the samples are summarized in Table 2, below. It is industrially accepted, at least by some in the calcium oxide/hydroxide industry, that the slaking quality of a calcium oxide sample may be determined, at least in part, by examining: (1) the temperature rise of the slaking materials while slaking over 180 seconds, (2) the total temperature rise of the slaking materials, and (3) the total slake time (as determined by the ASTM C110 procedure, which is hereby incorporated in its entirety by reference). For Table 2, higher temperatures rises over the 180 second time period, higher total temperature rises, and lower total slake times each typically indicate that the slaked material will typically exhibit greater reactivity, as well as better acid-reducing properties.

TABLE 2

|  | R30 (° C.) | R60 (° C.) | R180 (° C.) | Trise (° C.) | Ttime (sec) |
| --- | --- | --- | --- | --- | --- |
| Example A | 20.2 | 34.5 | 52.3 | 52.8 | 207 |
| Example B | 26.5 | 46.9 | 56.7 | 56.7 | 179 |
| Example C | 21.7 | 24.1 | 41.3 | 51.1 | 345 |
| Example D | 23.9 | 32.3 | 54.2 | 55.2 | 228 |

Based on the results listed in Table 2, it was found that the highest temperature rise and shortest slake time were observed for the example using RLF and a slaking start water temperature of 25° C. (Example B). Even when using a slaking start water temperature of 0° C. (Example D), the RLF slaked to a higher total temperature rise than the SLF sample slaked at 25° C. (Example A). The effects of colder slaking start water temperatures were magnified in the SLF slakes, with the lowest R60, R180, and total temperature rises being observed in Example C. In addition, the longest slake time was observed for the SLF slake conducted at 0° C. slaking start water temperature (Example C).

These results tend to show that the RLF has improved chemical qualities and usability for the end user over SLF. For example, because the RLF is less sensitive to water temperature, end users will typically see improved results, even when the end user in unable to narrowly control the starting water temperature. On the other hand, the data in Table 2 shows that SLF suffers from less advantageous reactions in water, especially when water outside of the prescribed starting temperature range is used. These advantages for RLF also likely translate to other applications, wherein the RLF will likely be more efficient and better-reacting than SLF.

Next, the compositions of each sample (Examples A, B, C, and D) were determined. Specifically, the calcium hydroxide slurry percent solids, grit production, and grit composition were determined, and the results of these determinations are summarized in Table 3, below.

TABLE 3

|  | Slurry Percent Solids | +30 m Grit (g) | Portlandite {Ca(OH)$_2$} (g) | Lime {CaO} (g) | Calcite {CaCO$_3$} (g) | Quartz {SiO$_2$} (g) | Cristobalite {SiO$_2$} (g) |
| --- | --- | --- | --- | --- | --- | --- | --- |
| Example A | 26.38 | 1.8559 | 1.53 | 0.02 | 0.30 | 0.01 | 0.00 |
| Example B | 27.98 | 0.0006 | N/A | N/A | N/A | N/A | N/A |
| Example C | 22.56 | 19.9232 | 17.75 | 1.58 | 0.54 | 0.03 | 0.03 |
| Example D | 26.85 | 0.0038 | N/A | N/A | N/A | N/A | N/A |

As shown in the data in Table 3, the RLF slakes (Examples B and D) produced only trace amounts of +30 mesh grit as compared to the SLF slakes. In fact, the grit reduction between comparative SLF and RLF slakes shows that the +30 mesh grit for the RLF was several magnitudes less than that produced with SLF. Further, by examining the grit composition of the SLF slakes (Examples A and C), it may be observed that slaking with cold water (0° C.) resulted in about a magnitude increase in the amount of grit formed, the majority of which was portlandite and, to a lesser extent, calcium oxide. The use of cold water (0° C.) also corresponds with about a 4% reduction in slurry percent solids for SLF slakes. On the other hand, the use of cold water on the RLF slakes (Examples B and D) only minimally increases grit production, with a change in slurry percent solids of only about 1%.

Thus, similar to above, these results tend to show that the RLF has improved chemical qualities and usability for the end user over SLF. For example, because the RLF is less sensitive to water temperature, end users will typically see improved results, even when the end user in unable to narrowly control the starting water temperature. Specifically, the end product calcium hydroxide may be made more efficiently per pound of calcium oxide feedstock when using RLF, and the resultant calcium hydroxide will likely require less post-processing to remove grit. On the other hand, the data in Table 3 shows that SLF suffers from less advantageous reactions in water, especially when water outside of the prescribed starting temperature range is used. Specifically, SLF tends to produce much more grit. These advantages for RLF also likely translate to other applications, wherein the RLF will likely be more efficient and better-reacting than SLF.

X-ray diffraction (herein also referred to as "XRD") analyses were carried out on the grit collected from the SLF slakes, and the masses of individual phases were calculated. This information is also listed in Table 3. As may be apparent from Table 3, there was not enough grit available to perform the XRD analyses on the RLF slakes. From the XRD results collected for the SLF slakes, it is evident that the cold water slaking temperature drives the formation of large, unreactive portlandite agglomerates, which may result in significant waste for the calcium hydroxide end user. In addition, the presence of free calcium oxide in the Example C grit indicates that the slaking reaction was terminated early due to calcium hydroxide occluding calcium oxide particles and preventing further slaking.

Figure 2:
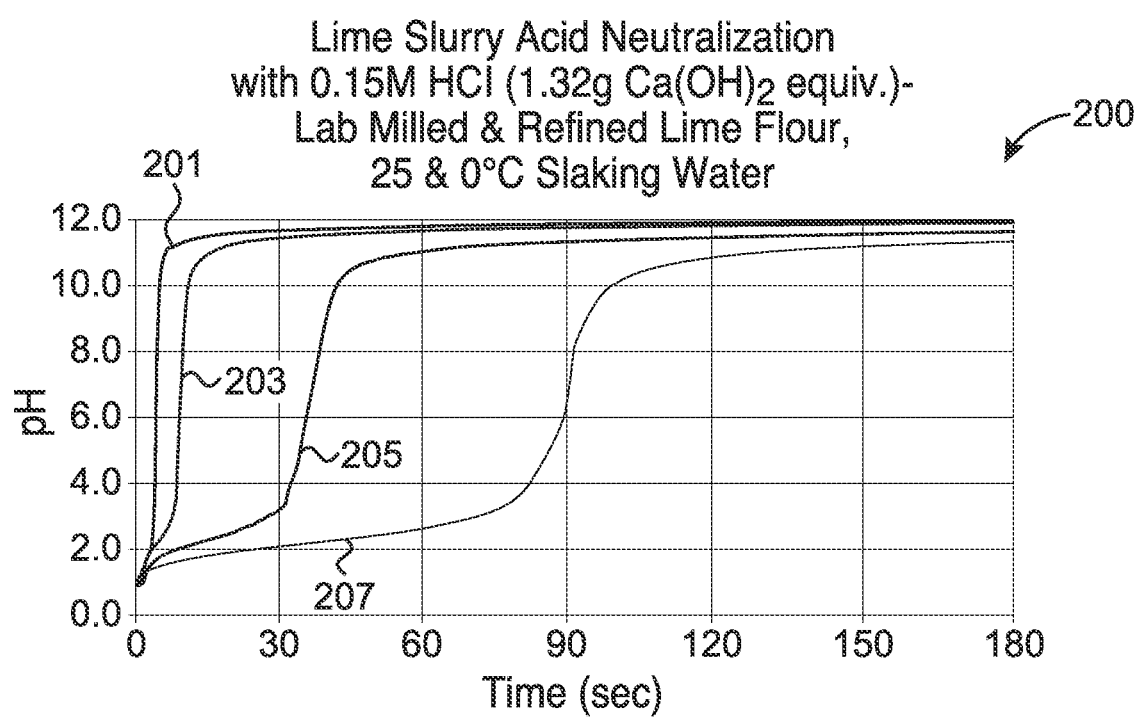
FIG. 2 depicts a plot of pH levels over time during acid neutralization testing using 0.15M HCl of two samples of a lime flour slurry and two samples of a refined lime flour slurry.

As discussed above, one method of qualitatively measuring the reactivity of a calcium hydroxide slurry is to use acid neutralization testing. Experiments were carried out on each SLF sample and each RLF sample using acid at the same concentration and volume and titrating with the same amount of calcium hydroxide to explore the effects of Examples A, B, C, and D on acid neutralization kinetics. The plotlines in FIG. 2 depict the results of the acid neutralization study. Specifically, FIG. 2 depicts a plot of pH levels over time during acid neutralization testing using 0.15M HCl and 1.32 g of calcium hydroxide, with each plotline being calcium hydroxide from a different one of Examples A, B, C, and D. The first plotline (201) is for the measurements collected for Example B, above. The second plotline (203) is for the measurements collected for Example D. The third plotline (205) is for the measurements collected for Example A. The fourth plotline (207) is for the measurements collected for Example C.

Based on these plotlines in FIG. 2, it is apparent that the RLF slurries had more favorable acid neutralization kinetics than the SLF slurries. These more favorable acid neutralization kinetics generally indicate a narrow particle size distribution and a small average particle size for the calcium hydroxide in the RLF slurries. In addition, the variation between the RLF slurry reactivity curves shown in FIG. 2 (the first plotline (201) and the second plotlines (203) for Example B and Example D, respectively) suggest that the use of cold slaking water does not greatly hinder the formation of smaller, more reactive calcium hydroxide particles when slaking with RLF. In stark contrast, the SLF slurries (the third plotline (205) and the fourth plotline (207) for Example A and Example C, respectively) did not react quickly nor reach as high of a final pH compared to the RLF slurries, as shown in FIG. 2 and Table 4, below. This is indicative of the formation of larger, less reactive calcium hydroxide particles with a wider particle size distribution. This wider particle size distribution is evidenced by the large variation in reactivity depicted in FIG. 2 for the third plotlines (205) and the fourth plotline (207). For example, there is nearly a 60 second difference in the time that it took the tests to reach a pH of 8.0 (similar for a pH of 10.0) between the third plotline (205), which shows results for Example A, and the fourth plotline (207), which shows results for Example C.

TABLE 4

| Example | Time (sec) to Reach pH 10 | pH After 180 sec |
| --- | --- | --- |
| Example A | 43 | 11.64 |
| Example B | 6 | 11.94 |
| Example C | 100 | 11.36 |
| Example D | 12 | 11.89 |

Thus, like the above tests, the data in Table 4 suggests that RLF will produce a more reactive calcium hydroxide slurry than one made with SLF. Thus, the RLF may be more useful and efficient than SLF.

Figure 3:
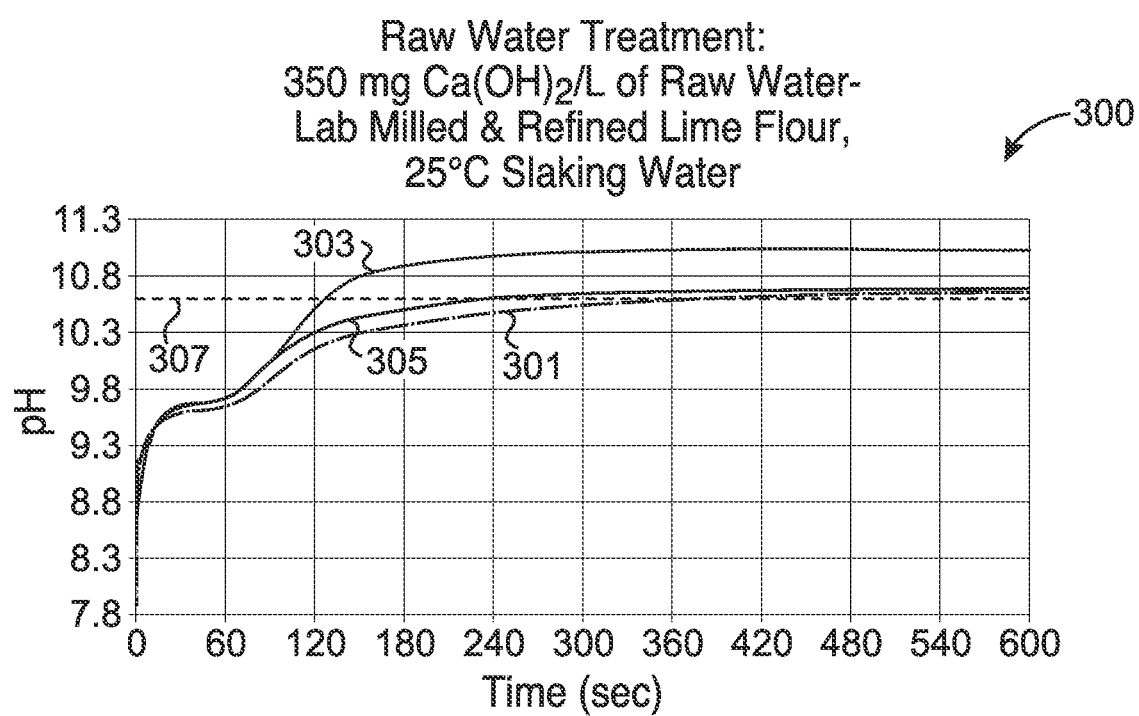
FIG. 3 depicts a plot of pH levels over time during water treatment testing of one sample of a lime flour slurry and two samples of a refined lime flour slurry.

Another testing method for evaluating calcium hydroxide slurry performance is titrating a raw water sample to a target pH and establishing a required calcium hydroxide dosage to meet that target pH. This established required dosage amount may then be used with other calcium hydroxide products to determine if a subsequently tested calcium hydroxide product is more or less effective at altering the pH of the raw water. This testing may be referred to herein as the water treatment test. The results of performing the water treatment test on Example A, which is a SLF slurry that was slaked at 25° C., and Example B, which is a RLF slurry that was slaked at 25° C., are shown in FIG. 3. Specifically, FIG. 3 depicts a plot of pH levels over time during the water treatment testing. The first water treatment test plotline (301) is a plot of the water treatment test on Example A. The second water treatment test plotline (303) is a plot of the water treatment test on Example B. The third water treatment test plotline (305) is a plot of the water treatment test on Example B, wherein the amount of Example B that was used during testing was reduced by 10% compared to the amount of Example B used in the testing for the second plotline (303). Finally, the target pH, which was 10.6, is represented by a dashed line (307) included in FIG. 3.

For this water treatment test, samples of the SLF slurry (Example A) were dosed into a fixed amount of raw water. The required dosage to treat the water (using Example A) to a target pH of 10.6 (307) was determined. For Example A, a lime dosage of 350 ppm (350 mg Ca(OH)$_2$/L of raw water) was required to reach the target pH of 10.6 (307). The pH of the water with the added Example A material is plotted as the first water treatment test plot (301) in FIG. 3. It was found that the RLF slurry at the same slaking start water temperature, Example B, overshot the pH target at the 350 ppm dosage, and that a 10% reduction in dosage could be used to achieve the same pH target as the SLF slurry shown in FIG. 3. The pH of the water with the added Example B material is plotted as the second water treatment test plot (303) in FIG. 3, and the pH of the water with 10% less of Example B material is plotted as the third water treatment test plot (305). Further, the pH of the water when subjected to Example B (303) reached the target pH (307) after just over 120 seconds, while the pH of the water when subjected to Example A (301) reached the target pH (307) at around 360 seconds. Thus, Example B was able to alter the pH of the water much more quickly than was Example A.

Figure 4:
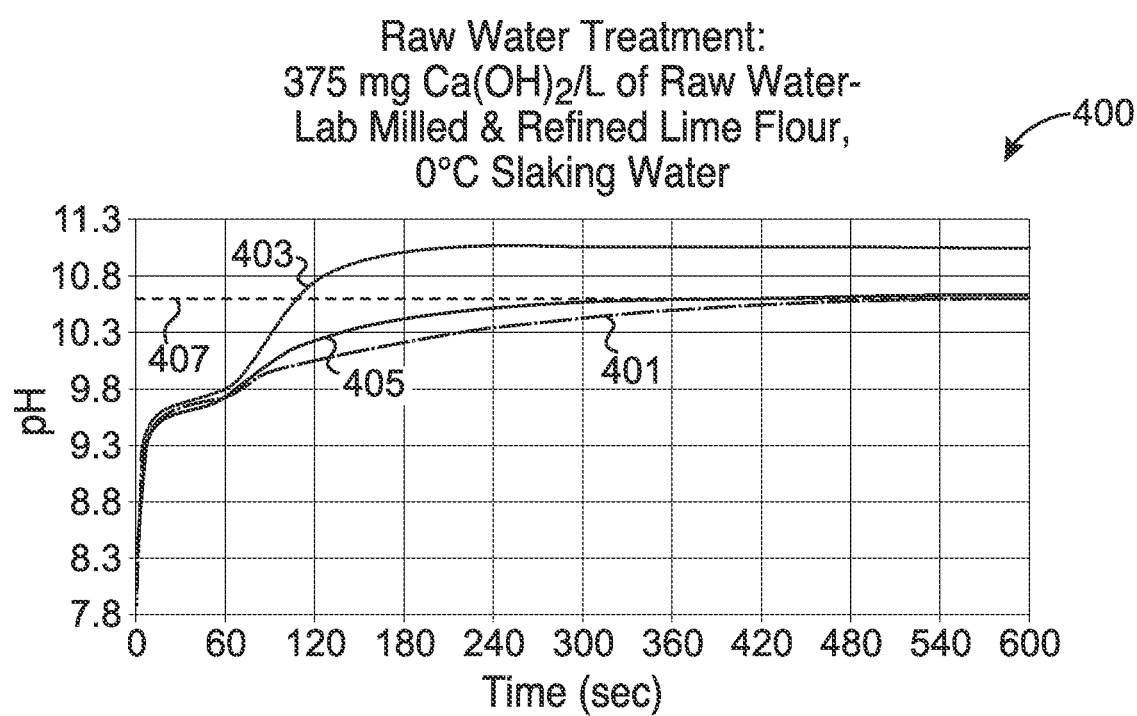
FIG. 4 depicts a another plot of pH levels over time during water treatment testing of one sample of a lime flour slurry and two samples of a refined lime flour slurry.

The results of performing the water treatment test on Example C, which is a SLF slurry that was slaked at 0° C., and Example D, which is a RLF slurry that was slaked at 0° C., are shown in FIG. 4. Specifically, FIG. 4 depicts a plot of pH levels over time during water treatment testing. The fourth water treatment test plotline (401) is a plot of the water treatment test on Example C. The fifth water treatment test plotline (403) is a plot of the water treatment test on Example D. The sixth water treatment test plotline (405) is a plot of the water treatment test on Example D, wherein the amount of Example D that was used was reduced by 15% compared to the amount of Example D used in the testing for the fifth plotline (403). Finally, the target pH, which was 10.6, is represented by the dashed line (407) included in FIG. 4.

For this second water treatment test, samples of the SLF slurry (Example C) were dosed into a fixed amount of raw water. The required dosage to treat the water (using Example C) to a target pH of 10.6 (407) was determined. For Example C, a larger (compared to Example A) lime dosage of 375 ppm (375 mg Ca(OH)$_2$/L of raw water) was required to reach the target pH of 10.6 (407). The pH of the water with the added Example C material is plotted as the fourth water treatment test plotline (401) in FIG. 4. It was found that the RLF slurry at the same slaking start water temperature, Experiment D, overshot the pH target at the 375 ppm dosage, and that a 15% reduction in dosage could be used to achieve the same pH target as the SLF slurry shown in FIG. 4. The pH of the water with the added Example D material is plotted as the fifth water treatment test plotline (403) in FIG. 4, and the pH of the water with 15% less of Example D material is plotted as the sixth weather treatment test plot (405). Thus, the results show that a 15% reduction in dosage could be achieved using the RLF slurry slaked at 0° C. versus the SLF slurry slaked at 0° C. to meet the same target pH. Further, the pH of the water when subjected to Example D (403) reached the target pH (407) just before reaching 120 seconds, while the pH of the water when subjected to Example C (401) reached the target pH (407) at around 540 seconds. Thus, Example D was able to alter the pH of the water much more quickly than was Example C.

Thus, like the above tests, the data in FIGS. 3 and 4 suggests that RLF will produce a more reactive calcium hydroxide slurry than one made with SLF. Thus, the RLF may be a more useful and efficient than SLF. Further, this data shows that the RLF may be less sensitive to water temperature, which may assist end users of the calcium oxide.

Last, particle size analyses of the SLF slurries and RLF slurries were carried out using a MicroTrac laser diffraction analysis. The results of the MicroTrac laser diffraction analysis are tabulated in Table 5, below.

TABLE 5

|  | D10 | D50 | D90 |
| --- | --- | --- | --- |
| Example A | 2.308 | 4.685 | 10.505 |
| Example B | 2.091 | 4.115 | 7.830 |
| Example C | 2.137 | 4.825 | 41.345 |
| Example D | 2.009 | 4.430 | 13.425 |

As can be seen in Table 5, above, the RLF slurries (Examples B and D) had lower particle size values than their counterpart slurries produced from SLF (Examples A and C, respectively). The results correlate well with the acid neutralization testing in that the sample having the lowest d90 value (Example B) also produced the fastest reacting slurry in the acid neutralization testing (Example B), which is shown above in Table 4. Conversely, the worst performing slurry in the acid neutralization testing (Example C), which is shown in Table 4, had the highest d50 and d90 values (Example C). While the d90 value was lower for Example A when compared to Example D, the d10 and d50 values were lower for Example D than for Example A. This may explain why the reactivity for Example D was still faster than the reactivity of Example A, as shown in Table 4. Also from the data in Table 5, it can be seen that the effects of cold water slaking had a dramatic impact on the particle size when using a SLF slurry. However, the cold water effects were minimized in the RLF slurries.

Thus, the above data in the tables and in the FIGS. may demonstrate, through the various testing conducted, that RLF offers a commercially viable calcium oxide product that addresses grit and reactivity issues commonly found in coarser, less pure calcium oxide feedstocks. The data overall suggests that +30 mesh grit production is virtually eliminated when using RLF when slaking calcium oxide, even when slaking with 0° C. water. It may also be demonstrated that RLF slurries may produce higher temperature rises during slaking and shorter total slake times. These potential benefits may reduce a portion of the variability typically inherent in the slaking process. Through particle size and acid neutralization testing, it may be shown that the RLF slurries produce smaller, more reactive particles with a narrower overall particle size distribution than SLF slurries. Lastly, it may be shown that in water treatment testing, dosage reductions of 10-15% may be achieved by using a RLF slurry over a SLF slurry. Thus, RLF may offer calcium oxide end users the benefits of easy slaking to make a low-grit calcium hydroxide product without the loss of storage capacity or increased freight cost due to differences in the bulk densities of calcium oxide and calcium hydroxide.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This may be because related terms are purely geometric constructs having no real-world equivalent (for example, no sphere is every perfectly spherical), or there may be other reasons why a given term may be more precise than its real-world equivalent. Variations from geometric, mathematical, and other descriptions are unavoidable due to, among other things, manufacturing tolerances resulting in shape variations, defects and imperfections, non-uniform thermal expansion, and natural wear. Moreover, there exists for every object a level of magnification at which geometric, mathematical, and other precise descriptors fail, due to the nature of matter. One of ordinary skill would thus understand the term "generally" and relationships contemplated herein, regardless of the inclusion of such qualifiers to include a range of variations from the literal geometric, mathematic, or other meaning of the term in view of these and other considerations.

The invention claimed is:

1. A method of producing calcium oxide, the method comprising:
   providing a lime feed comprising calcium oxide and impurities;
   milling said lime feed to produce a standard lime flour, wherein said fine ground lime has a particle-size distribution of greater than 90% minus 100 mesh and less than 80% minus 200 mesh;

feeding said fine ground lime into an air classification system;

removing a refined fine lime from said air classification system wherein said refined fine lime has a particle size distribution of greater than 80% minus 200 mesh.

* * * * *